United States Patent
Bansal (10) Patent No.: US 7,802,090 B2
(45) Date of Patent: Sep. 21, 2010

(54) DETERMINING COMPOSITION OF AN INITIALIZATION VECTOR FOR ENCAPSULATING SECURITY PAYLOAD PROCESSING

(75) Inventor: Yogesh Bansal, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 1087 days.

(21) Appl. No.: 11/496,658

(22) Filed: Jul. 31, 2006

(65) Prior Publication Data

US 2010/0199085 A1    Aug. 5, 2010

(51) Int. Cl.
*H04L 29/06* (2006.01)
(52) U.S. Cl. .......................... 713/153; 380/262
(58) Field of Classification Search ................. None
See application file for complete search history.

(56) References Cited

U.S. PATENT DOCUMENTS 7,526,085 B1 *  4/2009  Bong .................... 380/37
2005/0188216 A1 *  8/2005  Crispin et al. .......... 713/190

* cited by examiner

*Primary Examiner*—Brandon S Hoffman
(74) *Attorney, Agent, or Firm*—Blakely, Sokoloff, Taylor & Zafman LLP

(57) ABSTRACT

A method which includes receiving a request to perform encapsulating security payload (ESP) processing for data exchanged between a node and an other node over a secure network connection established via an Internet Protocol security (IPsec) security association. Information associated with the IPsec security association is obtained based on the request. The information indicates a prepend data unit size for an initialization vector, a generated data unit size for the initialization vector and an append data unit size for the initialization vector. A composition of each initialization vector included with encrypted data exchanged between the node and the other node based, at least in part, on the prepend, generated and append data unit size for the initialization vector is then determined.

21 Claims, 7 Drawing Sheets

Pointers
300

|  | Prepend Size | Generated Size | Append Size |
|---|---|---|---|
| Pointer 1 | 1A | 1B | 1C |
|  | Prepend Value | Append Value | Cipher Block Size |
|  | 1D | 1E | 1F |
| Pointer 2 | Prepend Size | Generated Size | Append Size |
|  | 2A | 2B | 2C |
|  | Prepend Value | Append Value | Cipher Block Size |
|  | 2D | 2E | 2F |

|  | Prepend Size | Generated Size | Append Size |
|---|---|---|---|
| Pointer n | nA | nB | nC |
|  | Prepend Value | Append Value | Cipher Block Size |
|  | nD | nE | nF |

Pointers
300

|  | Prepend Size | Generated Size | Append Size |
|---|---|---|---|
| Pointer 1 | 1A | 1B | 1C |
|  | Prepend Value | Append Value | Cipher Block Size |
|  | 1D | 1E | 1F |
| Pointer 2 | Prepend Size | Generated Size | Append Size |
|  | 2A | 2B | 2C |
|  | Prepend Value | Append Value | Cipher Block Size |
|  | 2D | 2E | 2F |

• • •
• • •
• • •

|  | Prepend Size | Generated Size | Append Size |
|---|---|---|---|
| Pointer n | nA | nB | nC |
|  | Prepend Value | Append Value | Cipher Block Size |
|  | nD | nE | nF |

DETERMINING COMPOSITION OF AN INITIALIZATION VECTOR FOR ENCAPSULATING SECURITY PAYLOAD PROCESSING

BACKGROUND

In networking environments that include devices or nodes coupled to a network, various methodologies are used to establish and maintain a secure network connection. These networks may include, but are not limited to, wired or wireless local area networks (LAN/WLAN), wide area networks (WAN/WWAN), metropolitan area networks (MAN), personal area networks (PAN) and cellular or wireless broadband telephony networks. One example methodology used on these types of networks to establish and maintain a secure network connection uses an industry standard that is based on Internet communication protocols. This industry standard is the Internet Engineering Task Force, Network Working Group, Request for Comments: 4301, Security Architecture for the Internet Protocol, published December 2005 ("the IPsec standard").

An other related industry standard describes ways to encapsulate encrypted data exchanged between nodes on a secure network connection that is maintained according to the IPsec industry standard. This other industry standard is the Internet Engineering Task Force, Network Working Group, Request for Comments: 4303, IP Encapsulating Security Payload (ESP), published December 2005 ("the ESP standard"). Further, numerous cryptographic algorithms and modes to implement those cryptographic algorithms are part of a secure network connection when implementing IPsec and ESP. Cryptographic algorithms may include, but are not limited to, the Advanced Encryption Standard (AES), and the Triple Data Encryption Standard (3DES). Modes to implement AES or 3DES may include, but are not limited to Cipher Block Chaining (CBC) and Counter (CTR) modes.

Implementing IPsec and ESP to exchange data over a secure network typically requires an increasing amount of node resources as the rate that data is exchanged on a secure network connection increases. These node resources need to encrypt transmitted data and decrypt received data at ever increasing rates with ever increasing efficiency. The way the data is encrypted and decrypted likely varies based on the cryptographic algorithm and mode to implement the cryptographic algorithm. Typically, as part of a process described by the IPsec standard as an IPsec security association, nodes negotiate the cryptographic algorithm and mode and come to an agreement on which to use to exchange data. As mentioned above, this may include one of several different cryptographic algorithm and mode combinations.

DETAILED DESCRIPTION

As mentioned in the background, implementing IPsec and ESP to exchange data over a secure network may require an increasing amount of node resources as the rate that data is exchanged on a secure network connection increases. Additionally, a node may establish, terminate and re-establish secure network connections with numerous other nodes coupled to one or more networks. The possibility of several types of cryptographic algorithm and mode combinations makes implementing IPsec and ESP to exchange data in this type of changing network environment complicated and challenging. Challenges are also presented as new cryptographic algorithms and modes are developed and deployed to address security threats. Also, increasing demands to exchange data at increasing rates leads to a need to simplify the implementation of IPsec and ESP yet maintain or improve on overall performance (e.g., maintain a high data throughput) of a node.

In one example, a request is received to perform encapsulating security payload (ESP) processing for data exchanged between a node and an other node over a secure network connection established via an IPsec security association. Information is obtained that is associated with the IPsec security association, the information to indicate a prepend data unit size for an initialization vector (IV), a generated data unit size for the IV and an append data unit size to for the IV. A determination is made as to a composition of each IV included with encrypted data exchanged between the node and the other node based, at least in part, on the prepend, generated and append data unit size for the IV.

Figure 1:
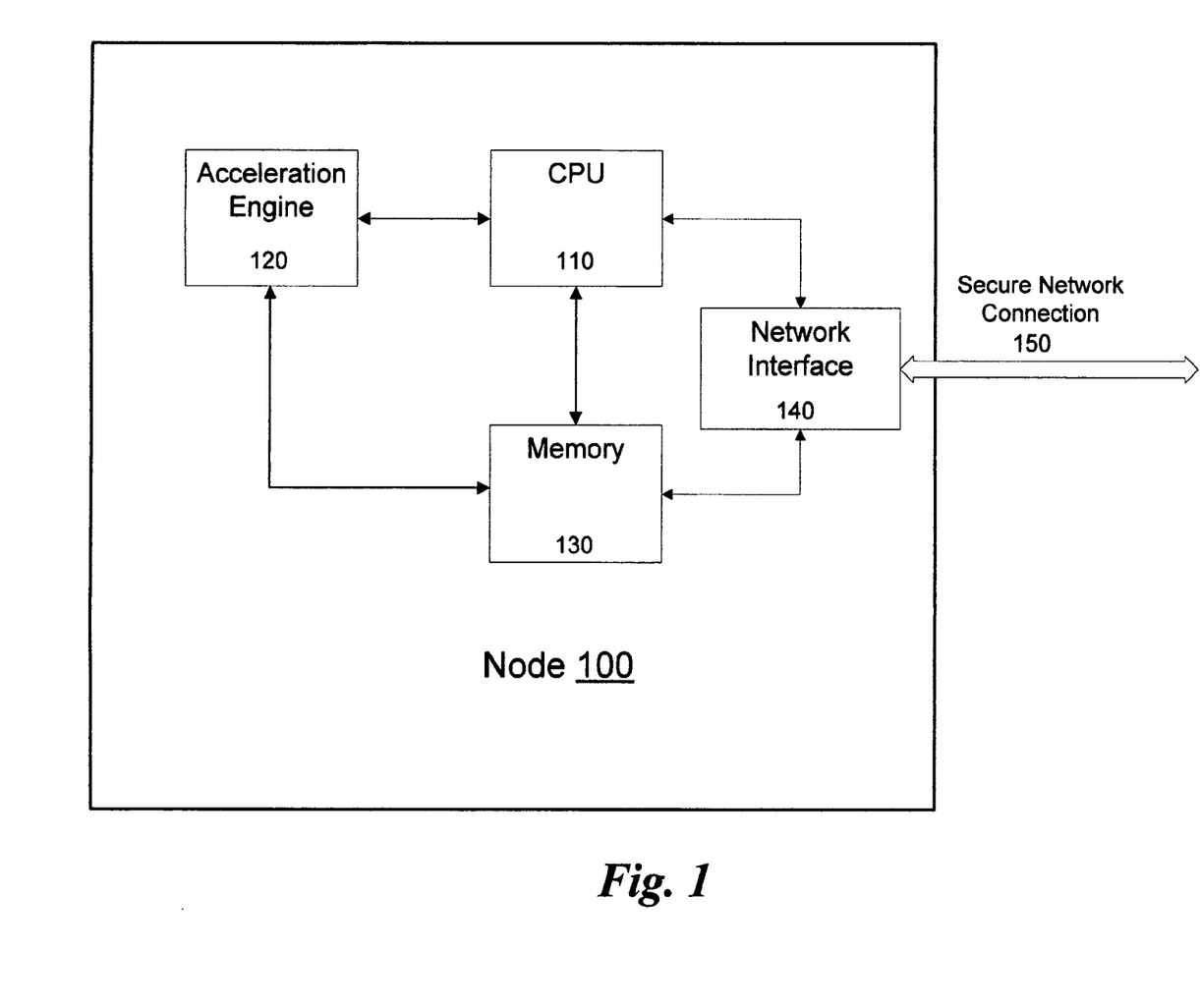
FIG. 1 is an example illustration of a node to exchange data with an other node over a secure network connection.

FIG. 1 is an example illustration of node 100 to exchange data with an other node (not shown) over a secure network connection. In one example, the secure network connection is depicted in FIG. 1 as secure network connection 150. In one implementation, secure network connection 150 may couple node 100 to an other node over various types of networks, e.g., LAN, WLAN, WAN, WWAN, MAN, PAN or cellular/wireless broadband telephony.

As shown in FIG. 1, for example, node 100 includes central processing unit (CPU) 110, acceleration engine 120, memory 130 and network interface 140. These elements of node 100, for example, are part of a computing platform. This computing platform may be a desktop computer, a laptop computer, a notebook computer, a server, a digital broadband telephony device, a digital home network device (e.g., cable/satellite/set top box, etc.), a personal digital assistant (PDA) and the like.

In one implementation, secure network connection 150 couples node 100 to an other node over a network. Secure network connection 150 may also utilize at least a portion of the Internet to couple node 100 to the other node. Network interface 140, for example, may operate in compliance with one or more communication protocols (including Internet Protocols) to enable communication with the other node. Elements of node 100 including network interface 140, for example, establish secure network connection 150 while operating in compliance with the IPsec industry standard. This may include an IPsec security association where node 100 negotiates with the other node a cryptographic algorithm and mode to use to exchange data over secure network connection 150.

In one example, information associated with the IPsec security association negotiated between node 100 and the other node to establish secure network connection 150 is at least temporarily stored in memory 130. As described in greater detail below, in one example, based on a request from CPU 110, this information is obtained by elements of acceleration engine 120. These elements may then perform ESP processing for data exchanged between node 100 and the other node over secure network connection 150 based at least in part on that obtained information.

Figure 2:
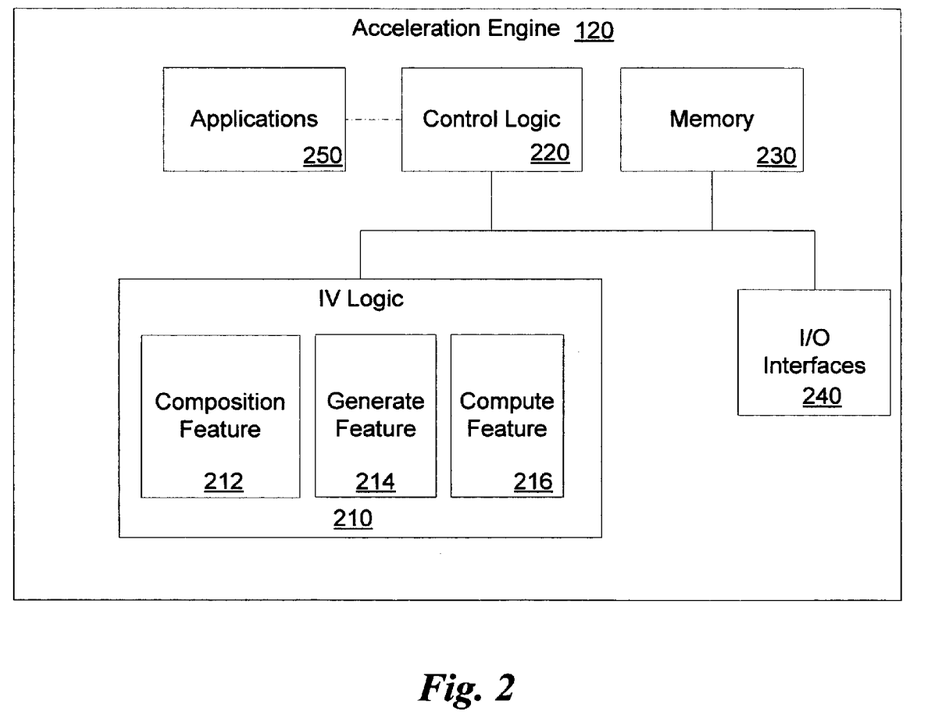
FIG. 2 is a block diagram of an example acceleration engine architecture.

FIG. 2 is a block diagram of an example architecture for acceleration engine 120. In FIG. 2, acceleration engine 120 includes initialization vector (IV) logic 210, control logic 220, memory 230, input/output (I/O) interfaces 240 and optionally one or more applications 250, each coupled as depicted.

In one example, the elements portrayed in FIG. 2's block diagram are those elements to support or enable an acceleration engine 120 as described in this disclosure. For example, IV logic 210 and control logic 220 each or collectively represent any of a wide variety of logic device(s) or executable content to implement the features of acceleration engine 120. These logic device(s) may include a microprocessor, network processor, service processor, microcontroller, field programmable gate array (FPGA), application specific integrated circuit (ASIC), sequestered thread or core of a multi-core/multi-threaded microprocessor, special operating mode of a processor or combination thereof.

In FIG. 2, IV logic 210 includes composition feature 212, generate feature 214 and compute feature 216. In one implementation, IV logic 210 uses these features to perform several functions. These functions, as described more below, for example, include determining a composition of a given IV included with encrypted data exchanged between node 100 and an other node on secure network connection 150. The functions also include, for example, constructing the given IV and determining/computing a pad length for a given block of encrypted data exchanged between node 100 and the other node.

Control logic 220 may control the overall operation of acceleration engine 120 and as mentioned above, may represent any of a wide variety of logic device(s) or executable content to implement the control of acceleration engine 120. In alternate examples, the features and functionality of control logic 220 are implemented within IV logic 210.

According to one example, at least a portion of memory 230 is memory that is used by the features of IV logic 210 to at least temporarily store information to determine and generate IVs and also to determine pad lengths associated with blocks of encrypted data. Memory 230 may also store executable content. The executable content may be used by control logic 220 and/or IV logic 210 to implement or activate features or elements of acceleration engine 120.

I/O interfaces 240 may provide an interface via a communication medium or link between acceleration engine 120 and elements resident on node 100 or located remotely to the node (e.g., a user or a network administrator). As a result, I/O interfaces 240 may enable IV logic 210 or control logic 220 to receive a series of instructions from these elements. The series of instructions may enable IV logic 210 and/or control logic 220 to implement one or more features of acceleration engine 120.

In one example, acceleration engine 120 includes one or more applications 250 to provide internal instructions to control logic 220 and/or IV logic 210.

Figure 3:
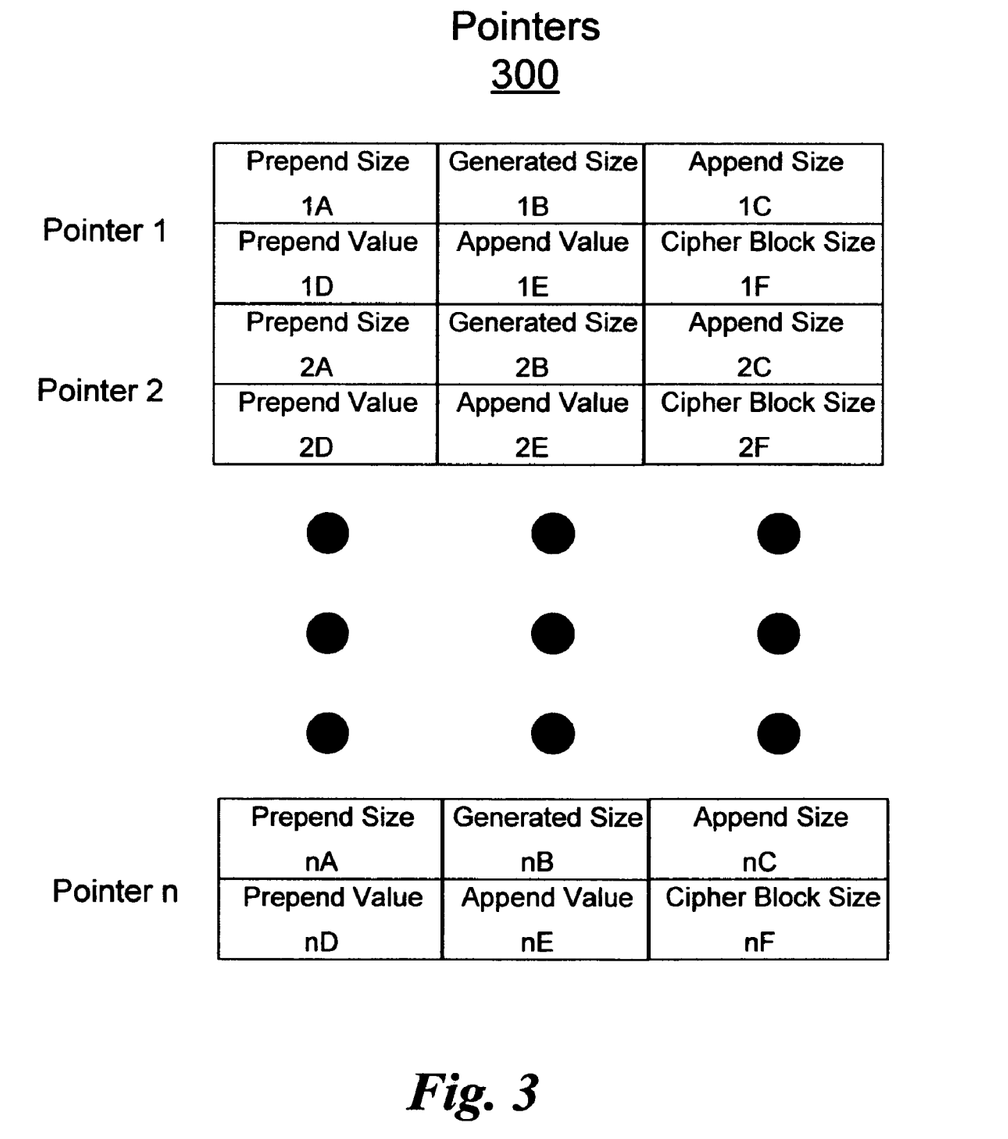
FIG. 3 is an example illustration of pointers for a memory where information and parameters associated with an IPsec security association are maintained.

FIG. 3 is an example illustration of pointers 300 for a memory where information and parameters associated with an IPsec security association is maintained. In one implementation, pointers 300 point to physical portions or addresses of memory 130 on node 100. As depicted in FIG. 3, pointers 300 include pointer 1, pointer 2 and pointer n, where "n" represents any positive whole integer greater than 2.

In one example, pointer 1 of pointers 300 includes information associated with an IPsec security association negotiated between node 100 and an other node to establish secure network connection 150. In this example, pointer 2 of pointers 300 may include information associated with an other IPsec security association negotiated between node 100 and the other node or with a different node than the other node. Pointer n, for example, represents yet an other IPsec security association.

In example implementations, an IV may or may not be included with encrypted data exchanged by node 100 with an other node. As described more below, the composition of an applicable IV may be determined after an explicit check is performed to find out what cryptographic algorithm (e.g., AES, 3DES) and a mode to implement that cryptographic algorithm (e.g., CBC, CTR) is associated with a given IPsec security association used to establish a given secure network connection. When implementing ESP processing, several different RFCs include information that is used to determine a composition of an IV (if needed) and a pad length (if needed) for encrypted data.

An RFC for the 3DES cryptographic algorithm that describes the use of CBC to implement 3DES includes the Internet Engineering Task Force, Network Working Group, Request for Comments: 2451, The ESP CBC-Mode Cipher Algorithms, published November 1998 ("RFC 2451"). An RFC for the AES cryptographic algorithm that describes the use of CBC to implement AES includes the Internet Engineering Task Force, Network Working Group, Request for Comments: 3602, The AES-CBC Cipher Algorithm and Its Use with IPsec, published September 2003 ("RFC 3602"). An RFC for the AES cryptographic algorithm that describes the use of CTR to implement AES includes the Internet Engineering Task Force, Network Working Group, Request for Comments: 3686, Using Advanced Encryption Standard (AES) Counter Mode With IPsec Encapsulation Security Payload (ESP), published January 2004 ("RFC 3686"). This disclosure is not limited to only the above listed RFCs for determining the composition of an applicable IV and to determine any applicable pad lengths for encrypted data.

In one implementation, fields 1A-1F of pointer 1 include information to determine a composition of and to construct/deconstruct an IV that is included with encrypted data exchanged between node 100 and the other node. These fields, for example, also include information to determine any pad length associated with a given block of encrypted data (if applicable).

In one example, an IV possibly included with encrypted data includes up to three sections. One section is hereafter referred as the "generated" section and the two other sections are hereafter referred to as the "prepend" and "append" sections. A prepend section, for example, is placed before the generated section. An append section, for example, is placed after the generated section. As described in more detail below (see FIG. 4), depending on a given cryptographic algorithm and mode to implement the cryptographic algorithm, the amount of data in each section of the IV will vary. Data lengths, for example, for prepend, generated and append are placed in fields 1A, 1B and 1C respectively. These data lengths for example are placed in fields 1A, 1B and 1C following an IPsec security association to establish a secure network connection (e.g., secure network connection 150) between the nodes to exchange encrypted data via the secure network connection.

In one implementation, based on the given cryptographic algorithm and mode to implement the cryptographic algorithm, one or more parameters associated with that given cryptographic algorithm and mode are stored or maintained in fields 1D, 1E, and 1F. In one example, these one or more parameters include values for the three sections of an IV possibly included with a given block of encrypted data. For example, fields 1D and 1E include a given value to prepend and an other given value to append to a generated section, respectively. Also, for example, these one or more parameters include a cipher block data unit size or length associated with each block of encrypted data that is encrypted using the given cryptographic algorithm and mode to implement the given cryptographic algorithm. This cipher block data unit size or length, for example, is included in field 1F and, as described more below, is used to calculate a possible pad length for a given block of encrypted data exchanged between the nodes.

Figure 4:
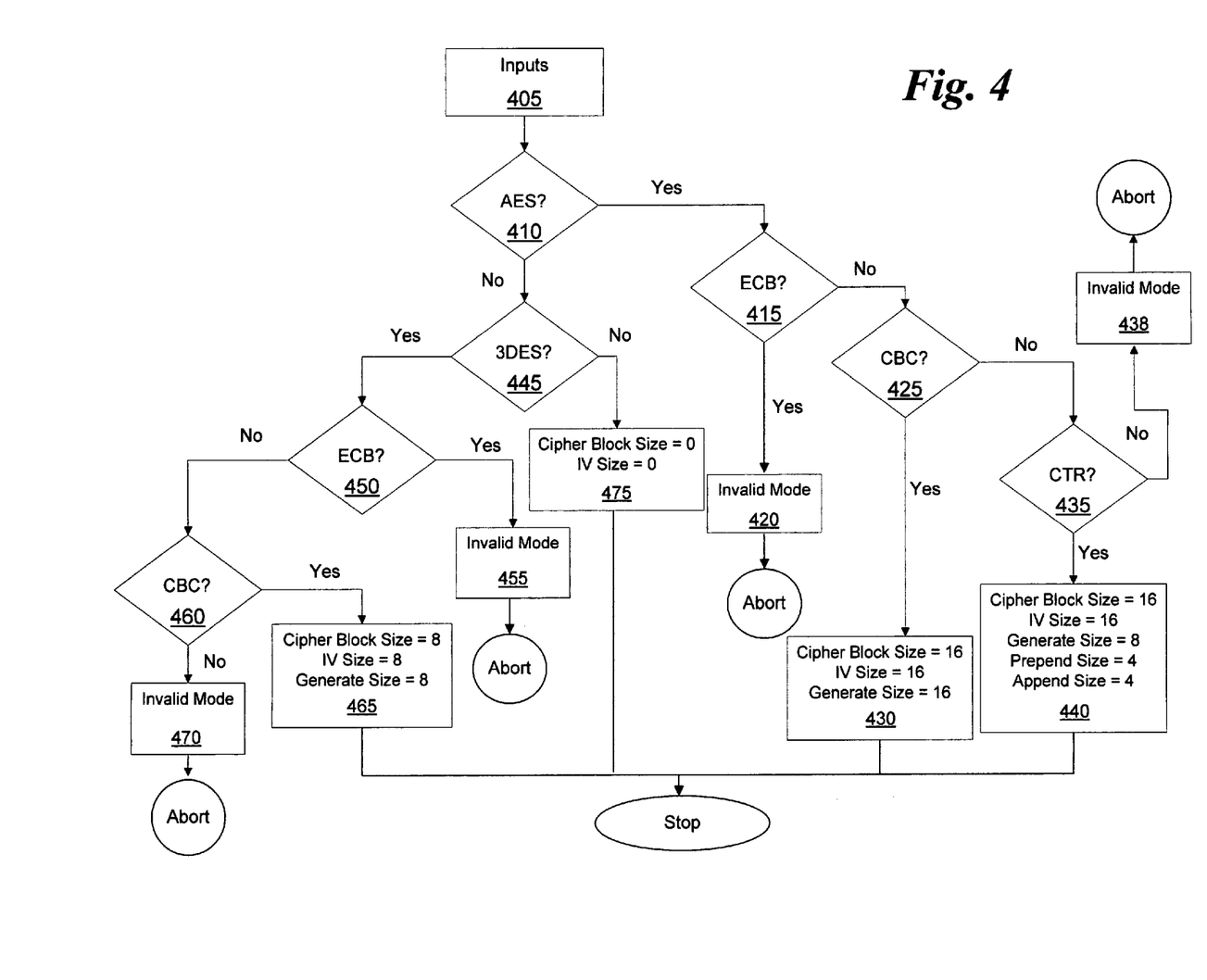
FIG. 4 is a flow chart of an example method for explicit checking of cryptographic algorithms and modes to implement a given cryptographic algorithm.

FIG. 4 is a flow chart of an example method for explicit checking of cryptographic algorithms and modes to implement a given cryptographic algorithm. This explicit checking, for example, is to determine what information and parameters associated with secure network connection 150 is to be maintained at pointer 1 of pointers 300. In one implementation, the example method is implemented by elements of node 100 (e.g., acceleration engine 120, CPU 110, network interface 140) following the establishment of secure network connection 150 with another node. In one example, an IPsec security association may include a given cryptographic algorithm and a mode to implement that given cryptographic algorithm. At block 405, for example, the given cryptographic algorithm and the mode are the inputs for the example method for explicit checking.

At block 410, for example, if the given cryptographic algorithm is AES, the method moves to block 415. At block 415, for example, if the mode to implement the AES cryptographic algorithm is Electronic Code Book (ECB), the process moves to block 420. At block 420, for example, the explicit checking process is aborted because IPsec does not support ECB. This, for example, may result in establishing a new IPsec security association or other corrective actions.

At block 425, for example, if the mode to implement the AES cryptographic algorithm is CBC, the process moves to block 430. At block 430, for example, according to RFC 3602, a 16-byte IV is included with encrypted blocks of data and the cipher block data unit size is 16 bytes. Also according to RFC 3602, the entire 16-byte IV is generated for each block of encrypted data and this results in a value of 0 for the prepend and append data unit lengths. Since there are no append and prepend, for example, the values indicated in fields 1A, 1C, 1D and 1E would be 0. The values in fields 1B and 1F to represent the generated section's data length and the cipher block data unit size would both indicate 16 bytes.

At block 435, for example, if the mode to implement the AES cryptographic algorithm is CTR, the process moves to block 440. At block 440, for example, according to RFC 3686, a 16-byte IV is included with encrypted blocks of data and the cipher block data unit size is 16 bytes. Also In one example, the 16-byte IV is broken into three sections. These three sections include a prepend section that has a 4-byte data length, a generated section that has an 8-byte data length and an append section that has a 4-byte data length. Therefore, in this example, the value in fields 1A, 1B and 1C would indicate data lengths of 4 bytes, 8 bytes and 4 bytes, respectively.

In one implementation, the one or more parameters associated with the AES cryptographic algorithm and the CTR mode include the prepend and append values that are prepended and appended to the 8-byte generated section of the IV. In one example, consistent with RFC 3686, the prepend value is a single use value or nonce that is associated with the IPsec security association that established secure network connection 150. This nonce is maintained in a memory (e.g., memory 130) and is indicated, for example, in field 1D. Also consistent with RFC 3686, for example, the append value is a counter value that begins with a value of one and increments with each block of encrypted data that is exchanged via secure network connection 150. Therefore the value in field 1E would initially indicate a value of one and for each time the counter value is obtained it is incremented, e.g., by a value of one. According to RFC 3686, for example, the cipher block data unit size is 16 bytes and thus the value in field 1F would indicate 16 bytes.

Figure 5:
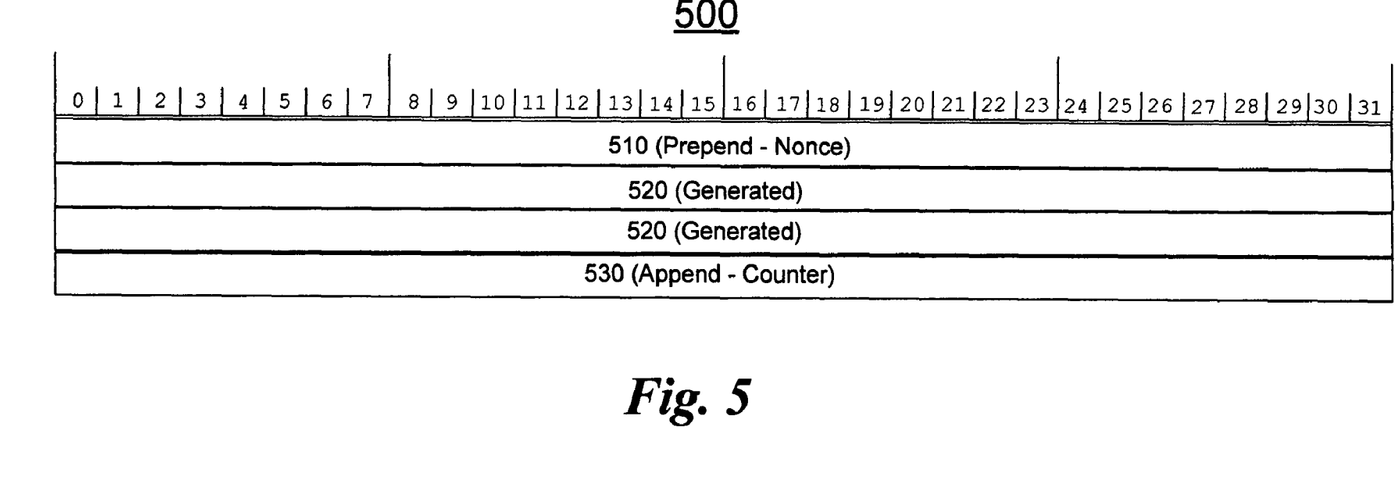
FIG. 5 is an example block format for an initialization vector associated with the given block of encrypted data.

As shown in FIG. 5, for example, block format 500 portrays an IV that is included with an encrypted block of data when using the AES cryptographic algorithm and the CTR mode as described in block 440 for the method portrayed in FIG. 4. In field 510, for example, is the prepend value obtained from field 1D of pointer 1. In field 520, for example, is the value for a generated section of the IV that is generated consistent with RFC 3686. For example, an 8-byte value is generated in any manner that leads to a high likelihood that the value is unique for the lifetime of a given security association. In field 530, for example, is the append value obtained from field 1E of pointer 1.

The block format 500 depicted in FIG. 5 is only one example of an IV format for an IV included with encrypted data. This disclosure is not limited to only IVs in block format 500 when using the AES cryptographic algorithm and the CTR mode or any other cryptographic algorithm and mode combinations.

Referring back to FIG. 4 and block 438. At block 438, for example, no mode to implement AES is indicated. In one example, this indicates an error in the explicit checking process. This error, for example, resorts in aborting the explicit checking and may also result in establishing a new IPsec security association or other corrective actions.

At block 445, for example, if the given cryptographic algorithm is 3DES, the process to moves to block 450. At block 450, for example, if the mode to implement the 3DES cryptographic algorithm is ECB, the process moves to block 455. At block 455, for example, the explicit checking process is aborted because IPsec does not support ECB. This, for example, may result in establishing a new IPsec security association or other corrective actions.

At block 460, for example, if the mode to implement the AES cryptographic algorithm is CBC, the process moves to block 465. At block 465, for example, according to RFC 2451, an 8-byte IV is included with encrypted blocks of data and the cipher block data unit size is 8 bytes. Also according to RFC 2451, the entire 8-byte IV is generated for each block of encrypted data and this results in a value of 0 for the prepend and append data unit lengths. Since there are no append and prepend, for example, the values indicated in fields 1A, 1C, 1D and 1E would be 0. The values in fields 1B and 1F of pointer 1 that represent the generated IV data length and the cipher block data unit size, respectively, would both indicate 8 bytes.

At block 470, for example, no mode to implement 3DES is indicated. In one example, this indicates an error in the explicit checking process. This error, for example, resorts in aborting the explicit checking and may also result in establishing a new IPsec security association or other corrective actions.

At block 475, for example, no cryptographic algorithm is indicated. As a result, for example, no IV or cipher block data unit size is associated with blocks of data exchanged between the nodes on secure network connection 150. Thus, for example, fields 1A-1F of pointer 1 will all indicate a value of 0. This may occur, for example, if the nodes are using a cryptographic scheme that does not call for a given IV and is not associated with a given cipher block data unit size for encrypted data.

Figure 6:
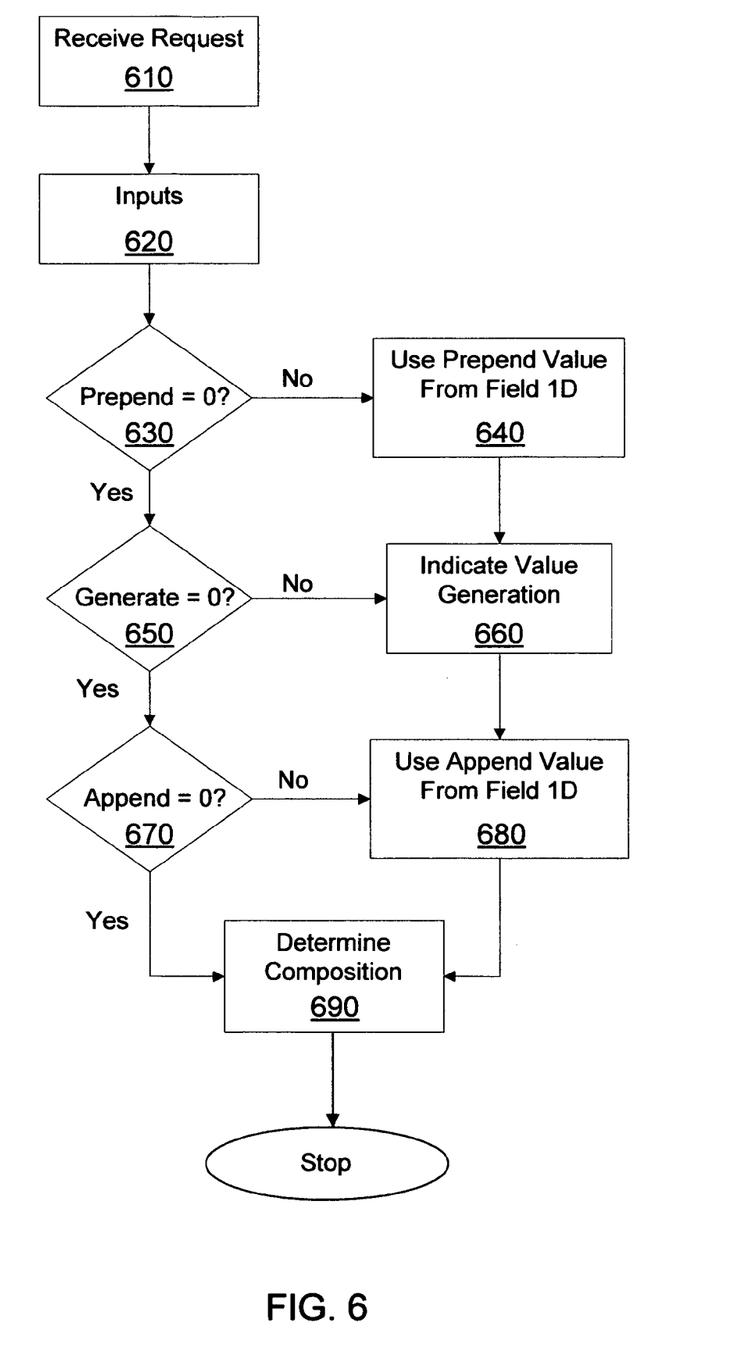
FIG. 6 is a flow chart of an example method to determine a given initialization vector included with encrypted data.

FIG. 6 is a flow chart of an example method to determine a given initialization vector to included with encrypted data. In one implementation, after the example method is implemented, this may enable node 100 to construct/deconstruct encrypted data exchanged with an other node over secure network connection 150. In this implementation, an IPsec security association to establish secure network connection 150 has been complete and the example method portrayed in FIG. 4 has been implemented. Also, the information and parameters associated with that IPsec security association are stored or maintained in a memory responsive to and/or resident on node 100, e.g., memory 130. In one example, the information and parameters are maintained at pointer 1 from among pointers 300 as described above for FIG. 3.

At block 610, for example, a request is received by acceleration engine 120 (e.g., from CPU 110) to perform ESP processing for data to be exchanged with the other node via secure network connection 150. In one example, this request includes pointer 1 from among pointers 300. As mentioned previously, pointer 1 may coincide with a portion of a memory responsive to node 100 (e.g., memory 130) that includes the information and parameters associated with the IPsec security association used to establish secure network connection 150.

At block 620, in one example, IV logic 210 activates composition feature 212. Composition feature 212, for example, obtains information associated with the IPsec security association using pointer 1 from among pointers 300. In one implementation, the information is used by composition feature 212 to determine the composition of an initialization vector included with encrypted data exchanged with the other node. This exchanging, for example, includes either sending or receiving encrypted data via secure network connection 150. In one example, the portion of the information and parameters obtained include prepend data length in field 1A, generated data length in field 1B and append data length in field 1C.

At block 630, in one example, composition feature 212 determines if the prepend data length obtained from field 1A is equal to 0. If not equal to 0, for example, at block 640, composition feature 212 uses a value maintained in field 1D as part of the IV to be composed.

At block 650, in one example, composition feature 212 determines if the generated data length obtained from field 1B is equal to 0. If not equal to 0, for example, at block 660, composition feature 212 may include an indication that a unique and/or random value that is difficult to estimate or reproduce is to be generated for a given section of the IV to be composed. Composition feature 212 may also indicate the data unit size of that given section.

At block 670, in one example, composition feature 212 determines if the append data length obtained from field 1C is equal to 0. If not equal to 0, for example, at block 680, composition feature 212 uses a value maintained in field 1E as part of the IV to be composed.

At block 690, in one example, composition feature 212 has determined the composition of a given IV to be included with encrypted data exchanged between node 100 and the other node via secure network connection 100. In one example, this composition is at least temporarily stored in a memory (e.g., memory 130 and/or memory 230). In one example, the method is implemented again based on another IPsec security association between node 100 and a different node or with the same node that establishes an other secure network connection.

In one implementation, the request to perform ESP processing also includes constructing a given IV to be included with a given block of encrypted data to be exchanged between node 100 and the other node via secure network connection 150. In this implementation, IV logic 210 activates generate feature 214. Generate feature 214, for example, obtains the composition temporarily stored by composition feature 212. Based on that composition, generate feature 214, for example, generates a given IV (if needed) to be included with the given block of encrypted data to be exchanged. For example, if prepend and append values apply to the given IV, generate feature 214 obtains those values from fields 1D and 1E, respectively. Generate feature 214, for example, generates or obtains a unique and/or random value that is difficult or nearly impossible to estimate or reproduce. The data unit size of that value, for example, is obtained from field 1B. Generate feature 214, if applicable, combines that value with the prepend and append values to construct the given IV.

In one implementation, the request to perform ESP processing also includes determining any applicable pad lengths associated with the given block of encrypted data. In this implementation, IV logic 210 activates compute feature 216. Compute feature 216, for example, obtains the cipher block data unit size from field 1F of pointer 1. In one example, based on the amount of data encrypted in the given block and the cipher block data unit size indicated in field 1F, compute feature 216 determines the pad length. For example, an IPsec security association associated with an AES cryptographic algorithm and CBC mode may result in field 1F indicating a cipher block data unit size of 16 bytes. Consistent with RFC 3602, for example, if the data encrypted in the given block is 14 bytes then compute feature 216 determines that the pad length is 2 bytes to ensure that the block of encrypted data is a total of 16 bytes.

Figure 7:
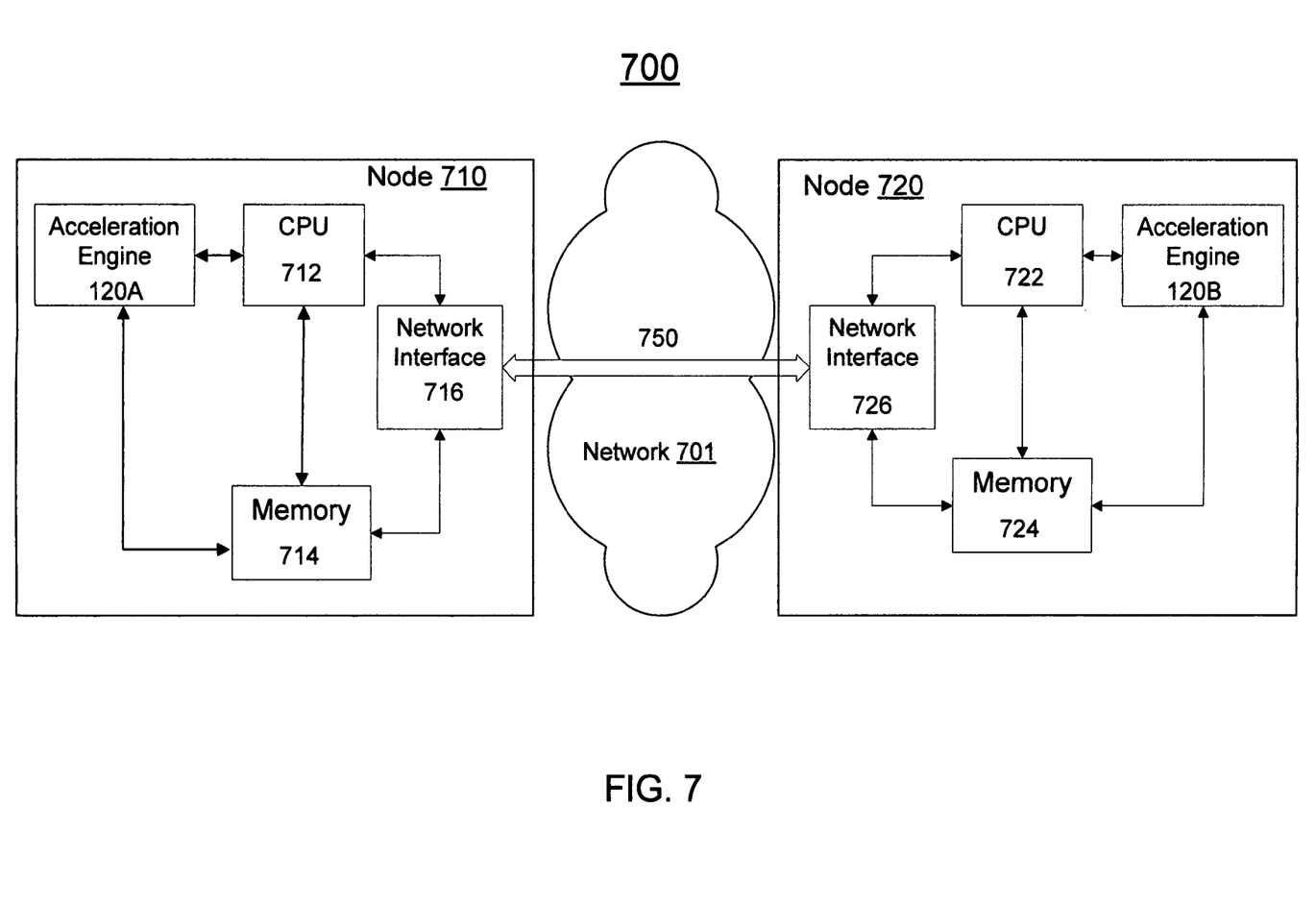
FIG. 7 is an example illustration of a system to include nodes that exchange data on a secure network connection over a network.

FIG. 7 is an example illustration of system 700 to include nodes 710 and 720 that exchange data on a secure network connection over network 701. In one implementation, network 701 is a LAN, WLAN, WAN, WWAN, MAN, PAN or cellular/wireless broadband telephony network. Similar to what was described above for node 100, nodes 710 and 720 may establish a secure network connection via an IPsec security association. This secure network connection is portrayed, for example, in FIG. 7 as secure network connection 750. Secure network connection 750, for example, utilizes at least a portion of the Internet to couple node 710 to node 720.

In one example, nodes 710 and 720 each include a computing platform that includes at least the elements mentioned above for node 100. In one example, these elements are depicted in FIG. 7 for node 710 as acceleration engine 120A, CPU 712, memory 714 and network interface 716 and for node 720 as acceleration engine 120B, CPU 722, memory 724 and network interface is 726. These nodes, for example, establish secure network connection 750 in compliance with the IPsec industry standard. As mentioned above, this may include an IPsec security association where nodes negotiate a cryptographic algorithm and mode to use to exchange data over secure network connection 750.

In one implementation, information associated with the IPsec security association negotiated between node 710 and node 720 to establish secure network connection 750 is at least temporarily stored in each node's memory. That memory is depicted in FIG. 7 as memory 714 for node 710 and memory 724 for node 720. In one example, the example method for explicitly checking of cryptographic algorithms and modes used to implement a given cryptographic algorithm (see FIG. 4) is implemented by each node to determine what information is stored.

In one example, a request is received from a respective node's CPU to perform ESP processing for data exchanged between nodes 710 and 720 via secure network connection 750. Based on that request, the information stored in each node's memory is obtained by elements of that node's respective acceleration engine to perform at least a portion of the ESP processing. The example method to determine a composition of each IV included with a given block of encrypted data, for example, is implemented based on the request to perform ESP processing.

In one implementation, the composition of the IV (if needed) is used by elements of each node's acceleration engine to construct/deconstruct a given IV included with a given block of encrypted data exchanged between node 710 and 720. Also, any applicable pad lengths associated with the given block of encrypted data is determined based on the information stored in each node's memory (e.g., memory 714, 724) and on the size of the data encrypted.

Referring again to memory 130 in FIG. 1, memory 230 in FIG. 2 and memories 714 and 724 in FIG. 7. These memories may include a wide variety of memory media including but not limited to volatile memory, non-volatile memory, flash, programmable variables or states, random access memory (RAM), read-only memory (ROM), or other static or dynamic storage media. In one example, machine-readable instructions can be provided to these types of memory from a form of machine-accessible medium. A machine-accessible medium may represent any mechanism that provides (i.e., stores and/or transmits) information or content in a form readable by a machine (e.g., an ASIC, special function controller or processor, FPGA, router, node or other hardware device). For example, a machine-accessible medium may include: ROM; RAM; magnetic disk storage media; optical storage media; flash memory devices; electrical, optical, acoustical or other form of propagated signals (e.g., carrier waves, infrared signals, digital signals); and the like.

References made in the specification to the term "responsive to" are not limited to responsiveness to only a particular feature and/or structure. A feature may also be "responsive to" an other feature and/or structure and also be located within that feature and/or structure. Additionally, the term "responsive to" may also be synonymous with other terms such as "communicatively coupled to" or "operatively coupled to," although the term is not limited in this regard.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

What is claimed is:

1. A method comprising:
   receiving a request to perform encapsulating security payload (ESP) processing for data exchanged between a node and an other node over a secure network connection established via an Internet Protocol security (IPsec) security association;
   obtaining information associated with the IPsec security association, the information to indicate a prepend data unit size for an initialization vector, a generated data unit size for the initialization vector, and an append data unit size for the initialization vector; and
   determining a composition of each initialization vector included with encrypted data exchanged between the node and the other node based, at least in part, on the prepend, generated, and append data unit size for the initialization vector;
   maintaining one or more parameters associated with a cryptographic algorithm and a mode to implement the cryptographic algorithm, wherein the one or more parameters include:
   a prepend value to prepend to a generated section of each initialization vector included with encrypted data exchanged between the node and the other node, the given value having the prepend data unit size;
   an append value to append to the generated section of each initialization vector included with encrypted data exchanged between the node and the other node, the other given value having the append data unit size; and
   a cipher block data unit size associated with one or more blocks of encrypted data exchanged between the node and the other node,
   wherein the initialization vector includes the prepend value, the append value, and a generated value within the generated section,
   wherein the initialization vector initializes the mode to implement the cryptographic algorithm.

2. A method according to claim 1, wherein maintaining the one or more parameters comprises maintaining the one or more parameters in a memory resident on at least one of the node and the other node.

3. A method according to claim 2, wherein obtaining information associated with the IPsec security association, the information to indicate the prepend, generated and append data unit size for the initialization vector, comprises obtaining the information from the memory resident on at least one of the node and the other node.

4. A method according to claim 3, wherein receiving the request to perform ESP processing further comprises the request including one or more pointers associated with a location in the memory were the one or more parameters are maintained and where the information to indicate the prepend, generated and append data unit size for the initialization vector is obtained.

5. A method according to claim 1, the request to perform ESP processing further comprises the ESP processing to include constructing a given initialization vector to be included with a given block of encrypted data to be exchanged between the node and the other node and determining a pad length for the given block of encrypted data, wherein constructing the given initialization vector and determining the pad length includes:
   generating the generated value for the generated section of the given IV based on an indication of a generated data unit size greater than 0;
   obtaining from the one or more parameters the prepend value to prepend to the generated section of the given IV based on an indication of the prepend data unit size that is greater than 0 and prepending the prepend value to the generated value;

obtaining from the one or more parameters the append value to append to the generated section of the given IV based on an indication of the append data unit size that is greater than 0 and appending the append value to the generated value;

obtaining from the one or more parameters the cipher block data unit size and based on the cipher block data unit size determine the pad length for the block of encrypted data.

6. A method according to claim 1, wherein the cryptographic algorithm includes one of Advanced Encryption Standard (AES) and Triple Data Encryption Standard (3DES).

7. A method according to claim 1, wherein the mode to implement the cryptographic algorithm includes one of Cipher Block Chaining (CBC) or Counter (CTR).

8. A method according to claim 1, the cryptographic standard comprises Advanced Encryption Standard (AES) and the mode to implement AES includes Counter (CTR), wherein:

the prepend value includes a nonce associated with the IPsec security association that established the secure network connection;

the append value includes a counter value that begins with a value of one and increments with each block of encrypted data exchanged via the secure network connection; and the generated section includes a value to be generated for each block of encrypted data exchanged via the secure network connection.

9. An apparatus comprising:

a node to couple to an other node through a secure network connection established via an Internet Protocol security (IPsec) security association, the node to include logic to:

receive a request to perform encapsulating security payload (ESP) processing for data exchanged with the other node over the secure network connection;

obtain information associated with the IPsec security association used to establish the secure connection with the other node, the information to indicate a prepend data unit size for an initialization vector, a generated data unit size for the initialization vector and an append data unit size for the initialization vector; and determine a composition of each initialization vector to be included with encrypted data exchanged with the other node based, at least in part, on the prepend, generated and append data unit size for the initialization vector, wherein each initialization vector includes a prepend value prepended to a generated value and an append value appended to the generated value, wherein each initialization vector initializes a mode to implement a cryptographic algorithm.

10. An apparatus according to claim 6, further comprising the logic to:

maintain one or more parameters associated with the cryptographic algorithm and the mode to implement the cryptographic algorithm, the one or more parameters determined based on establishment of the secure network connection between the node and the other node, wherein the one or more parameters include:

the prepend value to prepend and the append value to append to a generated section of each initialization vector included with the encrypted data exchanged between the node and the other node; and a cipher block data unit size associated with one or more blocks of encrypted data exchanged between the node and the other node.

11. An apparatus according to claim 10, wherein to maintain the one or more parameters comprises the logic to maintain the one or more parameters in a memory resident on the node.

12. An apparatus according to claim 10, the request to perform ESP processing further comprises the ESP processing to include the logic to construct a given initialization vector to be included with a given block of encrypted data to be sent to the other node and determine a pad length for the given block of encrypted data, wherein the logic to construct the given initialization vector and determine the pad length includes the logic to:

generate the generated value for the generated section of the given IV based on an indication of the generated data unit size greater than 0;

obtain from the one or more parameters the prepend value to prepend to the generated section of the given IV based on an indication of the prepend data unit size that is greater than 0 and prepend the prepend value to the generated value;

obtain from the one or more parameters the append value to append to the generated section of the given IV based on an indication of the append data unit size that is greater than 0 and append the append value to the generated value;

obtain from the one or more parameters the cipher block data unit size and based on the cipher block data unit size determine the pad length for the block of encrypted data.

13. An apparatus according to claim 10, the request to perform ESP processing further comprises the ESP processing to include the logic to deconstruct the given initialization vector included with a given block of encrypted data received from the other node and the logic to determine a pad length for the given block of encrypted data, wherein the logic to construct the given initialization vector and determine the pad length includes the logic to:

generate the generated value for the generated section of the given IV based on an indication of the generated data unit size greater than 0;

obtain from the one or more parameters the prepend value to prepend to the generated section of the given IV based on an indication of the prepend data unit that is greater than 0 and prepend the prepend value to the generated value;

obtain from the one or more parameters the append value to append to the generated section of the given IV based on an indication of the append data unit that is greater than 0 and append the append value to the generated value;

obtain from the one or more parameters the cipher block data unit size and based on the cipher block data unit size determine the pad length for the block of encrypted data.

14. A system comprising:

a first node; and a second node coupled to the first node through a secure network connection established via an Internet Protocol security (IPsec) security association, the second node to include logic to:

receive a request to perform encapsulating security payload (ESP) processing for data exchanged with the first node over the secure network connection;

obtain information associated with the IPsec security association used to establish the secure connection with the first node, the information to indicate a prepend data unit size for an initialization vector, a generated data unit size for the initialization vector and an append data unit size for the initialization vector; and determine a composition of each initialization vector to be included with encrypted data exchanged with the first node based, at least in part, on the prepend, generated and append data unit size for the initialization vector, wherein each initialization vector includes a prepend value prepended to a generated value and an append value appended to the generated value, wherein each initialization vector initializes a mode to implement a cryptographic algorithm.

15. A system according to claim 14, further comprising the second node's logic to:

maintain one or more parameters associated with the cryptographic algorithm and the mode to implement the cryptographic algorithm, the one or more parameters determined based on establishment of the secure network connection with the first node, wherein the one or more parameters include:

the prepend value to prepend and the append value to append to a generated section of each initialization vector included with the encrypted data exchanged with the first node; and a cipher block data unit size associated with one or more blocks of encrypted data exchanged with the first node.

16. A system according to claim 15, wherein to maintain the one or more parameters comprises the second node's logic to maintain the one or more parameters in a memory resident on the second node.

17. A system according to claim 15, the request to perform ESP processing further comprises the ESP processing to include the second node's logic to construct a given initialization vector to be included with a given block of encrypted data to be sent to the first node and determine a pad length for the given block of encrypted data, wherein the second node's logic to construct the given initialization vector and determine the pad length includes the second node's logic to:

generate the generated value for the generated section of the given IV based on an indication of a generated data unit size greater than 0;

obtain from the one or more parameters the prepend value to prepend to the generated section of the given IV based on an indication of the prepend data unit size that is greater than 0 and prepend the prepend value to the generated value;

obtain from the one or more parameters the append value to append to the generated section of the given IV based on an indication of the append data unit size that is greater than 0 and append the append value to the generated value;

obtain from the one or more parameters the cipher block data unit size and based on the cipher block data unit size determine the pad length for the block of encrypted data.

18. A system according to claim 15, the request to perform ESP processing further comprises the ESP processing to include the second node's logic to deconstruct the given initialization vector included with a given block of encrypted data received from the first node and the second node's logic to determine a pad length for the given block of encrypted data, wherein the second node's logic to construct the given initialization vector and determine the pad length includes the second node's logic to:

generate the generated value for the generated section of the given IV based on an indication of a generated data unit size greater than 0;

obtain from the one or more parameters the prepend value to prepend to the generated section of the given IV based on an indication of the prepend data unit that is greater than 0 and prepend the prepend value to the generated value;

obtain from the one or more parameters the append value to append to the generated section of the given IV based on an indication of the append data unit that is greater than 0 and append the append value to the generated value;

obtain from the one or more parameters the cipher block data unit size and based on the cipher block data unit size determine the pad length for the block of encrypted data.

19. A machine-accessible medium comprising content, which, when executed by a machine causes the machine to:

receive requests to perform encapsulating security payload (ESP) processing for data exchanged between a node and another node over a secure network connection established via an Internet Protocol security (IPsec) security association;

obtain information associated with the IPsec security association, the information to indicate a prepend data unit size for an initialization vector, a generated data unit size for the initialization vector and an append data unit size for the initialization vector; and determine a composition of each initialization vector to be included with encrypted data exchanged with the other node based, at least in part, on the prepend, generated and append data unit size for the initialization vector, wherein each initialization vector includes a prepend value prepended to a generated value and an append value appended to the generated value, wherein each initialization vector initializes a mode to implement a cryptographic algorithm.

20. A machine-accessible medium according to claim 19, further comprising the machine to:

maintain one or more parameters associated with the cryptographic algorithm and the mode to implement the cryptographic algorithm, the one or more parameters determined based on establishment of the secure network connection between the node and the other node, wherein the one or more parameters include:

the prepend value to prepend and the append value to append to a generated section of each initialization vector included with the encrypted data exchanged between the node and the other node; and a cipher block data unit size associated with one or more blocks of encrypted data exchanged between the node and the other node.

21. A machine-accessible medium according to claim 20, the request to perform ESP processing further comprises the ESP processing to include the machine to construct a given initialization vector to be included with a given block of encrypted data to be exchanged between the node and the other node and the machine to determine a pad length for the given block of encrypted data, wherein the machine to construct the given initialization vector and determine the pad length includes the machine to:

generate the generated value for the generated section of the given IV based on an indication of a generated data unit size greater than 0;

obtain from the one or more parameters the append value to prepend to the generated section of the given IV based on an indication of the prepend data unit size that is greater than 0 and prepend the prepend value to the generated value;

obtain from the one or more parameters the append value to append to the generated section of the given IV based on an indication of the append data unit size that is greater than 0 and append the append value to the generated value;

obtain from the one or more parameters the cipher block data unit size and based on the cipher block data unit size determine the pad length for the block of encrypted data.

* * * * *